United States Patent [19]

Rosenblum

[11] 4,182,933

[45] Jan. 8, 1980

[54] SECURE COMMUNICATION SYSTEM WITH REMOTE KEY SETTING

[75] Inventor: Howard E. Rosenblum, Silver Spring, Md.

[73] Assignee: The United States of America as represented by the Secretary of the Army, Washington, D.C.

[21] Appl. No.: 800,371

[22] Filed: Feb. 14, 1969

[51] Int. Cl.[2] .......................... H04K 1/00; H04L 9/00

[52] U.S. Cl. .................................... 179/1.5 R; 178/22

[58] Field of Search ........................... 179/1.5; 178/22; 325/32

*Primary Examiner*—Howard A. Birmiel

*Attorney, Agent, or Firm*—John R. Utermohle

[57] ABSTRACT

An apparatus for maintaining secure communication between subscribers. A centrally located key distribution center, which includes a data processor, is utilized as a source of remotely selected working variables which are utilized to enable secure communication between a plurality of selected subscribers. Each subscriber in the system has a unique variable which identifies him to the data processor, and enables a secure communication with the data processor, which will then provide him with the working variable of the subscriber that he wishes to call. The key distribution center also reiteratively replaces the working variable of the caller, and the called subscriber if desired, each time contact is made with the key distribution center.

10 Claims, 2 Drawing Figures

FIG I

SECURE COMMUNICATION SYSTEM WITH REMOTE KEY SETTING

BACKGROUND OF THE INVENTION

1. Field of the Invention

Figure 1:
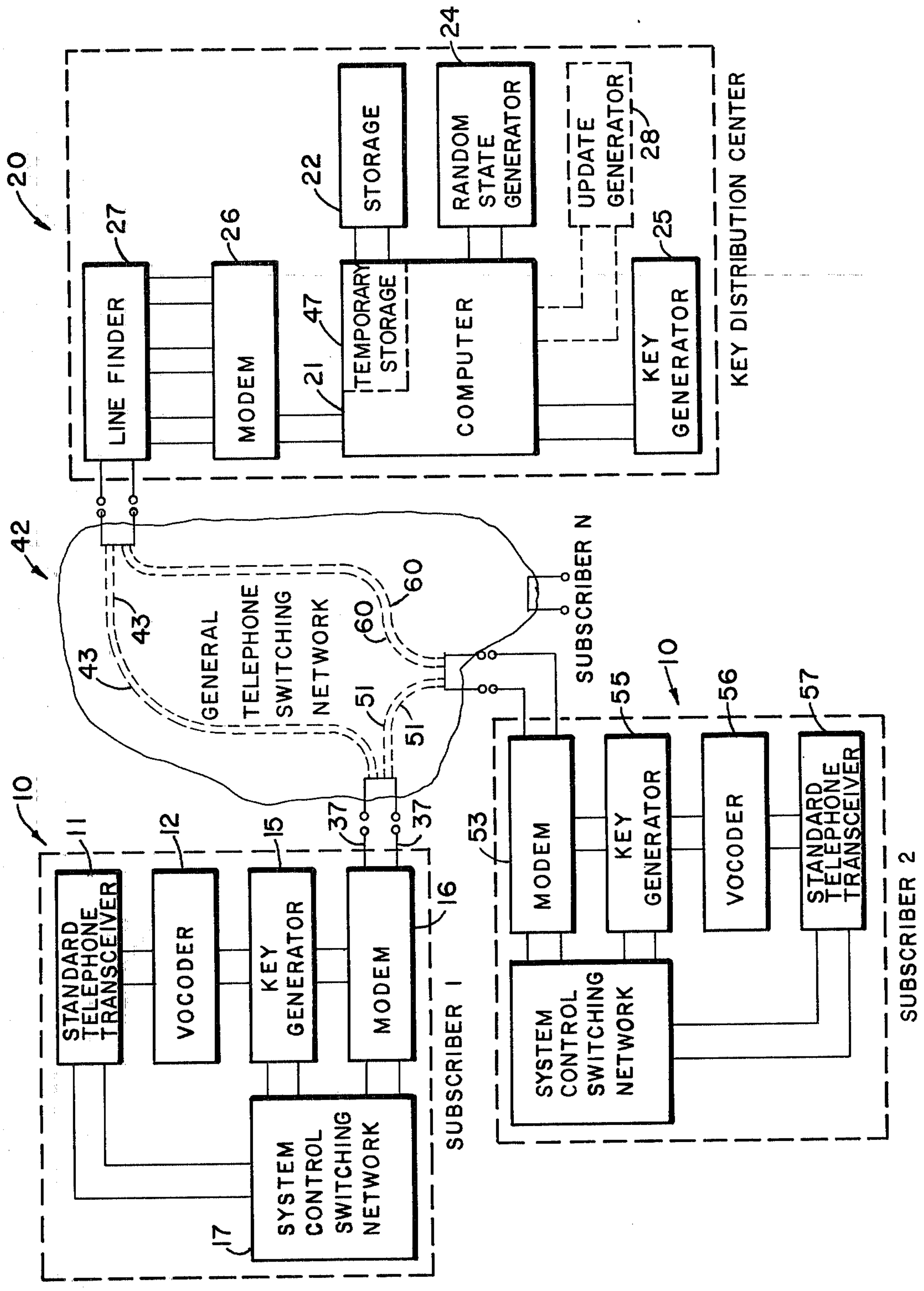

The present invention is a communication system, more particularly it is a secure communications system for maintaining secure communication between subscribers.

2. Prior Art

Prior art secure communication systems which utilize at least one working variable for enciphering and deciphering secure messages transmitted therein, do not remotely select these working variables for purposes of retransmission of a secure message between subscribers in the system. These prior art systems utilize a working variable which must be known to all subscribers receiving the secure message. This working variable, known by the subscribers, must be inserted into their enciphering/deciphering means in order to maintain secure communication. If each subscriber to the system has a different working variable, the one initiating the message in such a system must have at his disposal the working variable of the subscriber he wishes to call so that he may insert it in his enciphering/deciphering means in order to maintain a secure message between subscribers. This requires a substantial inventory of working variables at the place of message initiation, and reception, thus minimizing the security of the system.

Another feature of prior art secure communication systems, which has limited desirability from a security viewpoint, is the requirement that in order to change the working variables utilized in these systems these variables must be changed in accordance with a predetermined schedule, known to all subscribers in the system; thus, there is once again a minimization of security.

In the secure communication system of the present invention, the security liabilities of prior art systems are overcome by providing for an automatic reiterative replacement for the working variables of the system subscribers, and by providing a means by which the working variable of the subscriber which is called is remotely selected for purposes of retransmission by the subscriber initiating the call. By reiteratively replacing the working variables automatically, there is no need for conforming to a rigid schedule known to all parties. By accomplishing remote selection and reiterative replacement by some means external to the subscribers to the system, at some central location, an absolute maximization of system security is provided. This is due to the singular remote location of the necessary information, as opposed to the multiplicity of locations, one at each subscriber, necessary in prior art systems, as well as the fact that the actual working variable which is utilized, at any given time, is unknown to all subscribers in the system, the setting of the enciphering/deciphering means of the subscribers being accomplished automatically with information received from a remote selection means. Furthermore, the security of the system of the present invention is enhanced due to the ease of reiterative replacement, which may occur as often as once per message instead of once per day, or once per plurality of messages, as in prior art systems.

Prior art subscription television systems employing remote selection of switch setting information in order to allow the subscriber to receive a scrambled subscription television picture cannot provide for remote selection of a working variable in the sense that the switch setting information received is not utilized to transmit a secure message between the subscriber and another subscriber, but rather merely to receive information already existent.

SUMMARY OF THE INVENTION

An object of this invention is to provide a new and improved secure communication system which overcomes the disadvantages of the prior art.

Another object of the present invention is to provide a new and improved secure communication system wherein the information necessary to enable secure communication is remotely selected.

Another object of the present invention is to provide a new and improved secure communication system wherein the information necessary to enable secure communication is reiteratively varied.

SUMMARY

With these objects in view a secure communication system may include a remotely selectable means for selecting a key-setting variable and a unique variable and transmitting the remotely selected key-setting variable, the remotely selectable means including a means for reiteratively replacing the key-setting variable when the key-setting variable is remotely selected, the reiterative key-setting variable replacement replacing the key-setting variable necessary to maintain secure communication the next successive time remote selection occurs; a first means for initiating remote selection, for receiving the transmitted remotely selected key-setting variable, and for transmitting a secure communication enciphered in accordance with key-setting variable, the first receiving means being unique to the unique variable; and a second means for receiving communications from the first receiving means using the most recently obtained key-setting variable to enable secure communication between the first and second receiving means.

Figure 2:
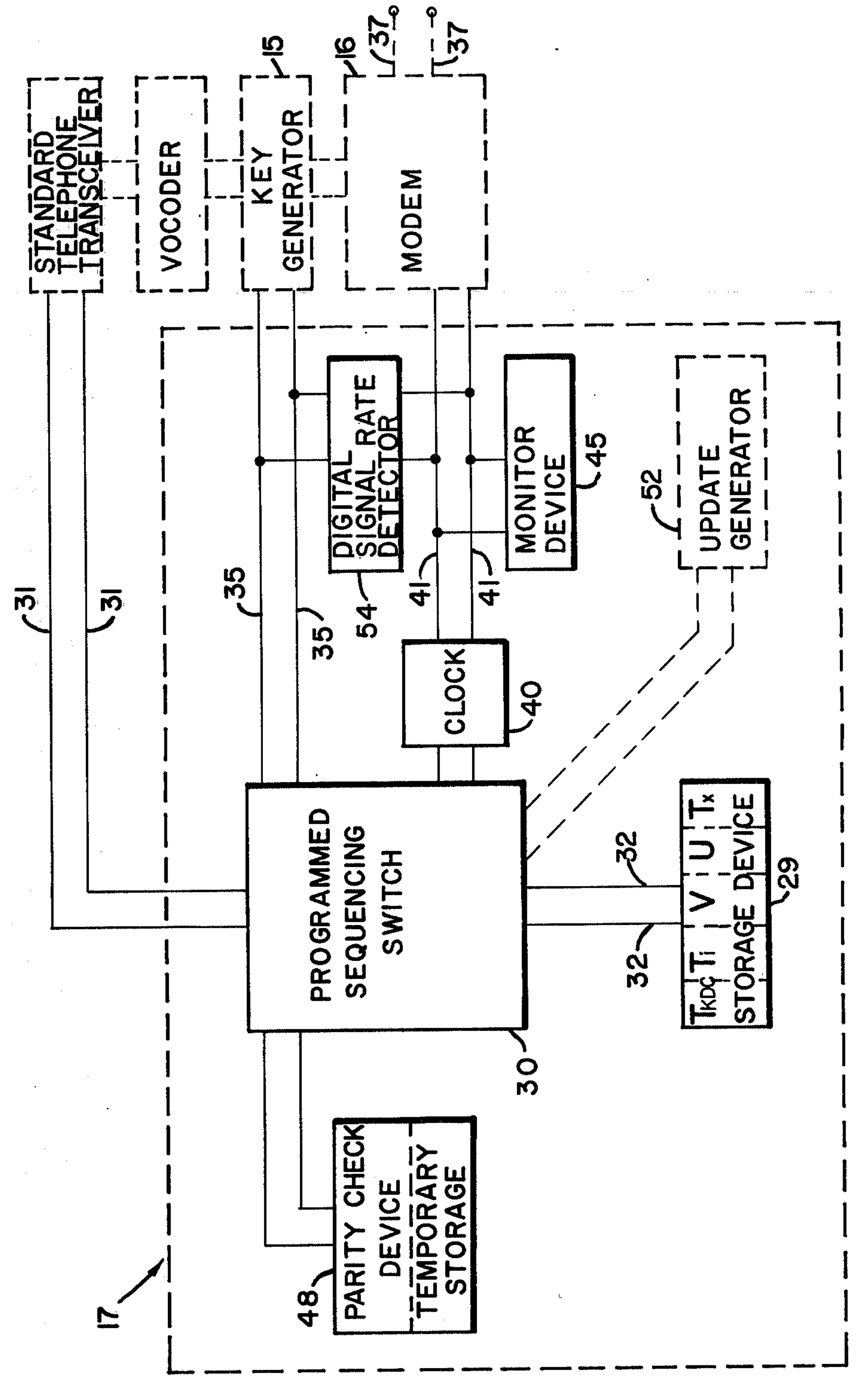

Other objects and many of the intended advantages of this invention will be readily appreciated as the invention becomes better understood by reference to the following description when taken in conjunction with the following drawings wherein:

FIG. 1 is a functional diagram of a system which is a preferred embodiment of the present invention, and FIG. 2 is a functional diagram of a portion of the system shown in FIG. 1.

Referring now to FIG. 1, which is a functional diagram of the entire system of the present invention, a general telephone switching network is shown, although the basic theory underlining the system is functional with any type of communication media. A subscriber has a secure module 10 comprising a standard telephone transceiver 11; a standard vocoder 12, or other speech-to-digit converter means such as a delta-modulation coder, or other digital communication device, such as a teletypewriter; a key generator 15; a modem 16, which is a standard modulator-demodulator communication device for accomplishing conversion of a digital signal to an analog type signal, and vice versa, for direct delivery to and from a telephone network; and a system control switching network 17, shown in more detail in FIG. 2, which supervises the overall operation of the subscriber module 10. Each subscriber to the system has an identical secure module with respect to structure, differing only in its associated security parameters, as will be explained herein below.

The key distribution center 20 is the heart of the system in that it provides the remote selection capability, as well as the reiterative replacement capability, of the present invention. The key distribution center 20, which is centrally located with respect to the subscribers to the system, comprises a standard computer 21, which has an associated storage means 22; a random state generator 24, for generating random variables to enable reiterative replacement, to be described later; a key generator 25; a modem 26; and a standard communication line-finder device 27, which acts as a concentrator and selects the open terminal pair of the modem 26 when contacted by a subscriber, the modem 26 shown as a singular modem having a plurality of terminal pairs, rather than a plurality of modems, for illustrative purposes. The key distribution center 20 may also contain an update generator 28, shown by hidden lines, when an alternate embodiment of the general system is utilized, to be explained later.

Just as the key distribution center 20 is the heart of the entire system, the system control switching network 17, shown in more detail in FIG. 2, is the heart of the subscriber module 10, as it controls the sequence of operations occurring in the subscriber module 10, from the initiation of a call to another subscriber in the system, until the cessation of contact with the called subscriber, and the going off line. The system control switching network 17 contains a storage device 29, which may be any type of standard storage device comprising either a permanent storage (read only) and temporary storage (read-write) portion, or be completely of the read-write variety. The selection of storage device 29 is merely a matter of choice, the system functioning equally well with other types of storage. For purposes of explanation, we will assume that a permanent storage-temporary storage type of storage device 29 is utilized.

A subscriber module storage device 29 would have in its permanent storage a unique key-setting variable, designated U, this unique key-setting variable being of a predetermined bit length, and being used for purposes of secure communication with the key distribution center computer 21, to be explained subsequently; the unique telephone number of the subscriber, designated $T_i$, consisting of the predetermined number of digits which are necessary to uniquely identify the subscriber in the system, the number of digits being dependent on the number of subscribers in the system; and the number of digits necessary to contact any subscriber in a world-wide system, for example 12 digits; and the unique telephone number of the key distribution center 20, designated $T_{KDC}$, consisting of the predetermined number of digits necessary to contact the key distribution center 20 from any point in a world-wide system, for example 12 digits. The temporary storage portion of the subscriber module storage device 29 would contain a key-setting variable, designated V, this key-setting variable being utilized to maintain a secure communication between any subscribers in the system having this key-setting variable; and, after a call has been initiated to another subscriber in the system, this operation to be subsequently explained, the telephone number of the subscriber being called, designated $T_x$, consisting of the predetermined number of digits necessary for contacting the called subscriber anywhere in the secure communication network, for example, 12 digits.

The key-distribution-center-computer-associated-storage device 22, which may be a drum storage, a tape storage, a disc storage, or any other acceptable computer-associated-storage means, would contain the unique variables and key-setting variables, associated with the telephone identification numbers of the subscribers, $T_i$, $T_x$, for all the subscribers in the secure communication system.

The function of the various key-setting variables in this system is to determine the key that is produced by the associated key generators, the key that is generated being generated from the key-setting variable, whether directly or indirectly, the generated key being utilized to encipher the communication in order to enable a secure message to be transmitted, and/or received. The key-setting variables associated with the key generators can be electrically changed so as to alter the key which is produced by the associated key generator, and thus vary the enciphering/deciphering of the message, enabling a more secure system than possible in prior art devices. In one embodiment of the general system, the key-setting variable of the called subscriber is directly utilized as the dynamic working variable, which is the variable which is ultimately utilized by the associated subscriber key generators to enable secure communication between associated subscribers whose key generators are set in accordance with the dynamic working variable. In an alternate embodiment of the general system, the key-setting variable of the called subscriber is not directly utilized as the dynamic working variable, but instead is combined with an indicator variable, which is a variable which denotes the function to be performed on the key-setting variable to update it, to obtain the dynamic working variable which is utilized to set the associated subscriber key generators.

The normal operating condition of all the subscriber modules 10 in the secure communication system of the present invention, when the telephone transceiver 11 is on-hook, in the particular embodiment where the key-setting variable is directly utilized as the dynamic working variable, is to have the associated working key-setting variable, V, filled into its associated key generator 15 while the subscriber is on-hook, so that he may receive a secure communication immediately after contact is established without any further operation being necessary in order to place him in the secure mode, unless it is desired to override this automatic operation with a manual switch means, to be explained later. The normal operating condition of all the subscriber modules 10 in the secure communication system of the present invention, when the telephone transceiver 11 is on-hook, in the alternate embodiment where the key-setting variable of the called subscriber is combined with an indicator variable to obtain the dynamic working variable, is to have the associated key generator 15 blank while the subscriber is on-hook.

OPERATION

The operation of the secure communication system of the present invention, in order to enable a secure communication between subscribers for the system, differs slightly for each embodiment, the differences to be subsequently explained, the choice of embodiment being dependent on the degree of security desired.

PREFERRED EMBODIMENT

The operation of the system when the particular embodiment, wherein the key-setting variable is directly utilized as the dynamic working variable, will be described first. In this embodiment, the subscriber initiating the call, for the purposes of illustration to be known as subscriber 1, dials the telephone number of the subscriber he wishes to call, for purposes of illustration to be known as subscriber 2, in any known manner. This operation inputs the called subscriber's telephone number, letting this number be represented by $T_x$, into the temporary storage portion of the calling subscriber module storage device 29, through the programmed sequencing switch 30, the sequencing switch 30 controlling the sequence of operations performed at the subscriber module 10 and being a standard sequencing means such as series of cyclical counters, the input to the switch being via a terminal pair 31—31 to the storage device 29 via another terminal pair 32—32. Simultaneously with the insertion of the called subscriber telephone number, $T_x$, into the storage device 29, the programmed sequencing switch 30 selects the unique variable, $U_1$, of its associated subscriber, which is initiating the call, and routes it to its associated key generator 15, via another terminal pair 35—35 where it replaces the working key-setting variable, $V_1$, of the caller by resetting the key generator 15 using the unique variable, $U_1$, which is a key-setting variable.

After this operation has been performed, the programmed sequencing switch 30 selects the telephone number of the key distribution center, $T_{KDC}$, from the permanent storage portion of the storage device 29, and routes it to the line 37—37 via a variable rate clock 40, which determines the proper readout rate, along the associated terminal pair 41—41 at the proper network rate determined by the clock 40, which for the Bell Telephone System would be 16 pulses per second, to the modem 16, where it is output over the telephone line 37—37 to connect the subscriber to the key distribution center 20 through the general telephone switching network 42 via the path shown, for purposes of illustration, by hidden lines 43—43. There is a monitor device 45 associated with the subscriber modem 16 which senses when the key distribution center 20 is on-line, due to a supervisory signal being received from the key distribution center 20, such as a sudden cessation of the completed ringing circuit.

When the key distribution center 20 is called, the line finder 27 locates an open terminal pair to its associated modem 26, and a supervisory signal, as was just previously described, is sent to the subscriber who has transmitted the telephone number of the key distribution center, $T_{KDC}$, enabling contact to be established.

When the subscriber receives the supervisory signal, from the key distribution center 20, the programmed sequencing switch 30 selects the predetermined number of digits necessary to uniquely identify the caller, $T_{i1}$, for purposes of illustration we will assume five digits, from the permanent storage portion of the storage device 29, and the same predetermined number of unique identifying digits from the telephone number of the called subscriber, $T_x$, in the example being given five digits are selected, and routes these to the phone line 37—37 via the clock 40, and through the modem 16 at a rate higher than the telephone switching network rate, this rate once again determined by the clock 40, via the established path 43—43 to the key distribution center 20 where it is routed to the computer 21. A higher information transfer rate is utilized due to the fact that the computer 21 information acceptance rate is faster than that of the telephone switching network 42, and this will minimize the time necessary to obtain the security parameters, which are the key-setting variables.

The computer 21 looks up in its associated storage 22 the unique key-setting variable of the caller, $U_1$, and the working key-setting variable, of the party being called, for purposes of illustration designated $V_x$, from the identification contact variables it has received, $T_{i1}$, and $T_x$. The computer 21 then feeds the caller's unique key-setting variable, $U_1$, into a high speed dynamic logic key generator 25, as the enciphering variable which will determine the key generated by the key generator 25. The computer 21 then draws a new working key-setting variable for the caller, $V_{1a}$, from the random state generator 24, which may be any random source, and puts this quantity in its temporary storage 47.

At this point, the computer 21 will generate a parity word so that error correction, or parity checking, may be accomplished in order to maintain the integrity of the transmission. If there is sufficient faith in the integrity of the transmission with the equipment that is utilized, the error correction procedure may be eliminated.

Several schemes may be utilized in order to accomplish parity checking. In one such scheme the computer 21 generates a parity word from the bit stream composed of the working key-setting variables of the called subscriber, $V_x$, and the reiteratively-replaced, working-key-setting variable, $V_{1a}$, of the caller, in order to provide a subscriber check of the accuracy of the transmission. This parity word is transmitted along with the information.

The computer 21 then inserts the working key-setting variable of the called subscriber, $V_x$, the reiteratively-replaced, working-key-setting variable of the caller, $V_{1a}$, and the parity word into its associated key generator 25 where it is enciphered in accordance with the unique key-setting variable of the caller subscriber, $U_1$. The computer 21 then transmits this information from the key generator 25 at the high computer 21 information rate to the caller subscriber via the established path 43—43.

After this information is sent from the computer 21, the enciphered stream is received by the caller subscriber through its modem 16, where this enciphered stream is immediately routed to the key generator 15 and deciphered. In this instance, it is not necessary to first go through the programmed sequencing switch 30, this being the only such instance in which programmed sequencing switch 30 is bypassed. After this information is deciphered, the key generator 15 sends this information to the programmed sequencing switch 30, which then commences parity checking by routing the information to the parity check device 48, which could be any standard parity checking device.

If the parity check results in a lack of parity condition, then a signal is sent to the caller, indicating parity does not exist and he must initiate the call again; a signal is also sent to the key distribution center 20. Upon receipt of the lack-of-parity signal by the key distribution center 20, the computer 21 clears the reiterative-working-key-setting-variable replacement of the caller, $V_{1a}$, from its temporary storage 47 location and goes off-line. The caller must then reinitiate the operation if he still desires to contact the called subscriber. Since parity did not exist, the working key-setting variable of the caller was not reiteratively replaced, as it was not inserted into the computer associated storage device 22.

If the parity check results in an existence of parity condition, then a parity check signal indicating this is sent to the key distribution center 20, and the reiteratively-replaced, working-key-setting variable of the caller, $V_{1a}$, is entered in the subscriber's storage device 29 in place of the previous subscriber working key-setting variable $V_1$; and the working key-setting variable of the called subscriber, $V_x$, is routed to the key generator 15 in order to reset the key generator 15 to a new key in accordance with the working key-setting variable of the called subscriber, $V_x$, in place of the unique key-setting variable of the caller subscriber, $U_1$.

The parity check signal indicating an existence of parity condition that is transmitted to the key distribution center 20, is routed to the computer 21, the computer 21 then entering the caller subscriber reiterative-working-key-setting-variable-replacement, $V_{1a}$, in its associated storage device 22 in place of the previous working key-setting variable of the caller subscriber, $V_1$, clears its temporary storage 47, and causes the key distribution center 20 to go off-line.

After the caller subscriber enters the working key-setting variable of the called subscriber, $V_x$, in its key generator 15, the programmed sequencing switch 30 removes the telephone number of the called subscriber, $T_x$, from the temporary storage portion of its storage device 29, and routes this phone number, $T_x$, to the phone line 37—37, via the clock 40, at the proper telephone switching network rate through its modem 16.

If the called subscriber telephone is off-hook and a busy signal is received, or if no answer is received, or at any time when the caller subscriber hangs up by placing his telephone 11 on-hook, the working key-setting variable of the called subscriber, $V_x$, is cleared from the key generator 15; the called subscriber's telephone number, $T_x$, is cleared from the storage device 29; and the subscriber module 10 reverts to the normal condition, in this case resetting the key generator 15 in accordance with the most recently obtained working key-setting variable associated with it, $V_{1a}$.

If the called subscriber answers, then a connection is established via a path 51—51, shown for illustrative purposes in FIG. 1 by hidden lines, and the secure communication enciphered by the key, generated in accordance with the called subscriber key-setting working variable, $V_x$, is received through the called subscriber's modem 53, which is identical with the caller subscriber's modem 16, and routed to a digital-signal-rate detector 54, which is a device which merely recognizes the transmission of a digital signal as opposed to an audio signal indicating the presence of cipher, the digital rate detector 54 being any standard bit rate detection means, such as a narrow filter at the frequency of the desired bit rate. The caller subscriber also transmits a cipher synchronizing stream in order to synchronize the key generators 15, 55, which are identical structurally, although this structural identity is not necessary for the operation of this system.

When the digital-signal-rate detector 54 of the called subscriber recognizes that it is cipher which is being transmitted, it passes this signal and routes it to the key generator 55 where it is deciphered and then, in turn, routed to the vocoder 56, and then to the associated telephone transceiver 57, whereby a secure communication is received.

A secure conversation may then be carried on between the subscribers, enciphered by the key derived in accordance with the working key-setting variable of the called subscriber, $V_x$, a message proceeding from the telephone transceiver; through the vocoder; to the key generator, where it is enciphered; through the modem; through the general telephone switching network into the other party's modem; through his key generator, where it is deciphered; through this vocoder; to his telephone transceiver. After the call is completed, and the caller hangs up, as was previously stated, his module 10 reverts to the normal condition, his key generator 15 being reset in accordance with his most recently obtained working key-setting variable, $V_{1a}$. There is no need for the key generator 55 of the called subscriber to be reset as it is already in its normal state, $V_x$, when the called subscriber hangs up.

If it is desired, reiterative replacement can be applied to the working key-setting variable of the called subscriber, as well as the caller subscriber, so that it would not be necessary for the called subscriber to initiate a telephone call to another subscriber in order to have his working key-setting variable, $V_x$, reiteratively replaced. A possible procedure for accomplishing this, when the above-described embodiment is utilized, is to have the programmed sequencing switch of the called subscriber, after he goes off-line, select the telephone number of the key distribution center, $T_{KDC}$, from his storage device and route it to the telephone line, then to the key distribution center 20 thus establishing a connection path 60—60, shown for illustrative purposes in FIG. 1 by hidden lines, and the same reiterative replacement operation as was previously described for the caller subscriber would occur, with the exception that, since another subscriber is not being called, the computer 21 will not receive any called subscriber telephone number, $T_x$, but rather will receive a stream of zeros in its place, since this position has been cleared from the storage device of the subscriber.

Upon receipt of this stream of zeros in place of $T_x$, the computer 21 will know that it is reiteratively replacing the called subscriber's working key-setting variable $V_x$. When parity exists and the key distribution center 20 goes off-line, the reiterative replacement of the working key setting variable, $V_x$, will be completed; the new reiterative replacement working key-setting variable, $V_{xa}$, will have been inserted in the computer associated storage device 22 in place of the previous working key-setting variable, $V_x$; and the key generator 55 of the called subscriber will have been reset in accordance with the new reiterative-replacement-working-key-setting-variable, $V_{xa}$. The called subscriber will then also go off-line.

ALTERNATE EMBODIMENT

The operation of the system when the particular embodiment wherein the key-setting variable of the called subscriber is combined with an indicator variable to obtain the dynamic working variable is utilized will now be described. In this embodiment, the subscriber key generators 15, 55 are blank in the normal state, as was previously mentioned.

The subscriber initiating the call, subscriber 1, does so in the same manner as in the previously described embodiment. The subsequent procedure for contacting the key distribution center 20, including selecting $U_1$ from the subscriber associated storage device 29 and routing it to the associated key generator 15, where it resets the key generator 15, is also accomplished in the same manner as for the previously described embodiment, with the exception that the key generator 15 is reset from its normal blank state rather than the normal $V_1$ state of the previous embodiment.

The operation of the key distribution center 20 in this instance is similar to the operation previously described, with the exception of the selection of an indicator variable for the called subscriber and the derivation of the dynamic working variable of the called subscriber from the indicator variable and key-setting variable, this operation to be subsequently described.

After the caller subscriber, subscriber 1, has transmitted the caller and called subscriber contact variables, $T_x$ and $T_i$, necessary to uniquely identify the subscribers in the system, to the key distribution center 20, the computer 21 looks up in its associated storage 22 the unique key-setting variable of the caller, $U_1$, and the key-setting variable of the party being called, $V_x$, from the identification contact variables it has received, as in the previously described embodiment.

The computer 21 then draws a new key-setting variable for the caller, $V_{1a}$, and an indicator variable for the called subscriber, $I_x$, from the random state generator 24, which may be any random source. The computer 21 then routes the called subscriber key-setting and indicator variables, $V_x$, $I_x$, to an update generator 28, which then forms the dynamic working variable of the called subscriber, designated $V_{xu}$, which is the update of the called subscriber key-setting variable, $V_x$, as a function of the called subscriber key-setting and indicator variables, $V_x$, $I_x$. The update operation consists of operating on the given variable, in this case $V_x$, to produce a different variable, $V_{xu}$, therefrom, as opposed to the new variable operation, wherein a new variable is generated, $V_{1a}$, the new variable not necessarily having any functional relationship to the given variable it is replacing, $V_1$; both these operations being classifiable as replacement.

The computer 21 puts the new key-setting variable for the caller, $V_{1a}$, in its temporary storage 21, and feeds the caller's unique key-setting variable, $U_1$, into the high speed dynamic logic key generator 25, as the enciphering variable which will determine the key generated by the key generator 25. Computer 21 then inserts the reiterately replaced key-setting variable of the caller, $V_{1a}$, and the dynamic working variable of the called subscriber, $V_{xu}$, into its associated key generator 25 where it is enciphered in accordance with the unique key-setting variable of the caller subscriber, $U_1$.

At this point, the computer 21 will generate a parity word so that error correction, or parity checking, may be accomplished in order to maintain the integrity of the transmission. As was previously mentioned, if there is sufficient faith in the integrity of the transmission with the equipment that is utilized, the error correction procedure may be eliminated.

As previously mentioned, several schemes may be utilized in order to accomplish parity checking. In one such scheme which may be utilized in this embodiment, the computer 21 generates a parity word from the unique variable $U_1$, enciphered bit stream composed of the reiteratively-replaced-key-setting variable of the caller, $V_{1a}$, and the dynamic working variable of the called subscriber, $V_{xu}$, and a redundant indicator variable, $I_{xxx}$, as a parity check, in order to provide a subscriber check of the accuracy of the transmission. These parity checks are transmitted along with the information, the computer 21 then transmitting the unique variable, $U_1$, enciphered key generator 25 output, the redundant indicator variable, $I_{xxx}$, and the parity word to the caller subscriber, subscriber 1.

After this information is sent from the computer 21, it is received by the caller subscriber and deciphered and checked for the existence of parity, in the same manner as for the previously described embodiment; the computer 21 clearing the reiterative-key-setting-variable replacement of the caller, $V_{1a}$, from its temporary storage location 47, and going off-line after the parity check is completed, entering $V_{1a}$ in its associated storage device 22 only if parity exists; and the reiterative-key-setting-variable replacement of the caller, $V_{1a}$, being entered in the subscriber's storage device 29 in place of the previous subscriber key-setting variable, $V_1$, when parity exists.

The caller subscriber then routes the dynamic working variable of the called subscriber, $V_{xu}$, to the key generator 15 in order to reset the key generator 15 to a new key in accordance with the dynamic working variable of the called subscriber, $V_{xu}$, in place of the unique key-setting variable of the caller subscriber, $U_1$.

After the caller subscriber enters the dynamic working variable of the called subscriber, $V_{xu}$, in its key generator 15, the programmed sequencing switch 30 removes the telephone number of the called subscriber, $T_x$, from the temporary storage portion of its storage device 29, and routes this phone number, $T_x$, to the phone line 37—37, via the clock 40, at the proper telephone switching network rate through its modem 16, in order to establish contact with the called subscriber in the same manner as in the previously described embodiment.

If the called subscriber telephone is off-hook and a busy signal is received, or if no answer is received, or at any time when the caller subscriber hangs up by placing his telephone 11 on-hook, the dynamic working variable of the called subscriber, $V_{xu}$, is cleared from the key generator 15; the called subscriber's telephone number, $T_x$, is cleared from the storage device 29; and the subscriber module 10 reverts to the normal condition, in this case, with the key generator 15 blanked.

If the called subscriber answers, then a connection is established via a path 51—51, shown for illustrative purposes in FIG. 1 by hidden lines. The caller subscriber then transmits the redundant indicator variable, $I_{xxx}$, in the clear to the called subscriber. The called subscriber receives the redundant indicator variable, $I_{xxx}$, and routes it, via its programmed sequencing switch 30, to its parity check device 48 where the redundancy, which is a standard error code, is removed yielding the nonredundant indicator variable, $I_x$.

The programmed sequencing switch 30 then routes the nonredundant indicator variable, $I_x$, to the subscriber update generator 52, shown by hidden lines as it is only present for this species, and removes the most recently obtained associated subscriber key-setting variable, $V_x$, from the storage device 29 and routes the stored key-setting variable, $V_x$, to the subscriber update generator 52, where the dynamic working variable of the called subscriber, $V_{xu}$, is formed as a function of the received indicator variable, $I_x$, and stored key-setting variable, $V_x$, in the same manner that the called subscriber dynamic working variable, $V_{xu}$, which was transmitted to the caller subscriber from the key distribution center 20, was formed in the key distribution center update generator 28. The indicator variable, $I_x$, is erased after the dynamic working variable, $V_{xu}$, is formed and the key-setting variable, $V_x$, is returned to the subscriber storage device 29. The programmed sequencing switch 30 then routes the dynamic working variable, $V_{xu}$, to the key generator 55, which is reset, from its normal blank state, in accordance with the dynamic working variable, $V_{xu}$.

A secure conversation may then be carried on between the subscribers, enciphered by the key derived in accordance with the dynamic working variable of the called subscriber, $V_{xu}$, a message proceeding from the telephone transceiver in the same manner as for the previous species. After the call is completed, and the caller hangs up, as was previously stated, his module 10 reverts to the normal condition, in this case his key generator 15 being blank, and the called subscriber dynamic working is erased, from both the caller and called subscribers.

By utilizing this embodiment, no further contact with the key distribution center 20 by the called subscriber is necessary, as the working variable, the one that is actually utilized to set the key used to encipher the secure communication, is automatically replaced each time a call is initiated, since the indicator variable, $I_x$, which is utilized to update the called subscriber key-setting variable, $V_x$, to form the dynamic working variable, $V_{xu}$, is changed each time a call is initiated. Since the caller subscriber key-setting variable is also replaced each time a call is initiated, a single cell to the key distribution center 20 is all that is necessary in this embodiment to change both the caller's key-setting variable and the called dynamic working variable, thus, increasing the security of the system. The choice of which embodiment to utilize is merely dependent on the degree of security and the number of system components desired, both embodiments being otherwise comparable.

The security of the system and the embodiments just described is enchanced by the fact that the key distribution center 20 does not need to have the secure messages transmitted through it, in order for it to control the switch network 42, but rather merely provides the necessary security working key-setting variable parameters, and then goes off-line. The key distribution center 20 could be used to control the secure communication network by being designed to refuse to divulge the working key-setting variables of selected subscribers in the system except to other selected subscribers, thereby establishing segregated secure communication networks within the system.

It is to be understood that the above described embodiments of the invention are merely illustrative of the principles thereof and that numerous modifications and embodiments of the invention may be derived within the spirit and scope thereof, such as inserting a manual switch in place of the digital-signal-rate detector so that the call may be initiated in a non-secure mode and, at the option of the operator, be switched to a secure mode; or by updating all the working key-setting variables instead of replacing them with a new variable.

What is claimed is:

1. A secure communication system comprising:

a remotely selectable means for selecting a key setting variable and at least one unique variable and transmitting a remotely selected key setting variable, the remotely selectable means including a means for reiteratively replacing the key setting variable when the key setting variable is remotely selected, said replacement of said key setting variable occurring the next successive time that remote selection is initiated;

a first means for initiating remote selection, for receiving the transmitted remotely selected key setting variable and for transmitting a secure communication enciphered in accordance with the key setting variable, the first receiving means being unique to said unique variable, said initiation of remote selection occurring each time said first receiving means desires secure communication with another receiving means; and a second means for initiating remote selection and for receiving communications from the first receiving means, using the key setting variable selected by the remotely selectable means upon initiation by said first receiving means to enable secure communication between said first and second receiving means, said first receiving means receiving a verified reiteratively replaced key setting variable from said remotely selectable means before communication with said second receiving means is accomplished.

2. A secure communication system in accordance with claim 1 wherein the remotely selectable means includes a means for reiteratively replacing the remotely selected key setting variable when the remotely selectable means selects the key setting variable.

3. A secure communication system in accordance with claim 2 wherein the reiterative replacement means includes a means for reiteratively replacing the remotely selected key setting variable each time the remotely selectable means selects the key setting variable.

4. A secure communication system in accordance with claim 3 wherein the remote selection transmission means includes a means for transmitting the reiterative key setting variable replacement to the first receiving means.

5. A secure communication system in accordance with claim 4 wherein the remote selection transmission means includes a means for enabling a secure communication between the first receiving means and the remote selection means using the unique variable.

6. A secure communication system in accordance with claim 5 wherein the first receiving means includes a first means for contacting the remotely selectable means to initiate a remote selection, and for contacting the said second receiving means after remote selection is complete, the contact between the first receiving means and the remotely selectable means being abrogated when remote selection has been completed, the remotely selectable variable has been transmitted to the appropriate receiving means, and secure communication established between the first receiving means and the second receiving means.

7. A secure communication system in accordance with claim 6 wherein the first contacting means includes a first means for storing information during remote selection, the information stored including a unique remotely selectable means contact variable, said contacting means automatically contacting the remotely selectable means using the unique remotely selectable means contact variable obtained from the first storage means, and a second means for storing information, the stored information including the key setting variable and the unique variable.

8. A secure communication system in accordance with claim 7 wherein the reiterative replacement means is a random state generator for generating a replacement for the dynamic working variable, the random state generator generating the replacement for the dynamic working variable associated with secure communication between said first and second receiving means; and the first contacting means includes a first key generator, the first key generator being set in accordance with the first receiving means unique variable, the first key generator decrypting any transmissions encrypted in the unique variable.

9. A secure communication system in accordance with claim 8 wherein the remote selection transmission secure communication enabling means is a second key generator, the second key generator being set in accordance with the first receiving means' unique variable, the remotely selected replacement receiving means dynamic working variable being transmitted in accordance with the first unique variable, the encrypted transmission being decrypted by the first key generator, and secure communication using the receiving means contact variable being established between the first and second receiving means.

10. A secure communication system in accordance with claim 9 wherein the second receiving means includes a second means for contacting the remotely selectable means and the first receiving means; the second contacting means including a third means for storing information, the stored information including the unique remote selection means contact variable, the second receiving means unique variable, and the current receiving means key setting variable, secure communication having been established between said first and second receiving means; a third key generator, said third key generator being set in accordance with the current dynamic working variable when secure communication between said first and second receiving means is desired.

* * * * *